United States Patent
Lee et al.

(10) Patent No.: US 6,720,372 B2
(45) Date of Patent: Apr. 13, 2004

(54) HALOGEN FREE FLAME RETARDANT THERMOPLASTIC STYRENE RESIN COMPOSITION

(75) Inventors: Sung-Ho Lee, Yeosoo (KR); Chan-Hong Lee, Daejeon (KR); Yong-Yeon Hwang, Daejeon (KR); Ki-Young Nam, Yeosoo (KR)

(73) Assignee: LG Chemical Co., Ltd., Seoul (KR)

( * ) Notice: Subject to any disclaimer, the term of this patent is extended or adjusted under 35 U.S.C. 154(b) by 71 days.

(21) Appl. No.: 10/111,839

(22) PCT Filed: Sep. 5, 2001

(86) PCT No.: PCT/KR01/01502
§ 371 (c)(1),
(2), (4) Date: Apr. 29, 2002

(87) PCT Pub. No.: WO02/20659
PCT Pub. Date: Mar. 14, 2002

(65) Prior Publication Data
US 2003/0004239 A1 Jan. 2, 2003

(30) Foreign Application Priority Data
Sep. 5, 2000 (KR) ......................................... 2000-52392

(51) Int. Cl.⁷ .............................. C08K 5/49; C08K 5/52
(52) U.S. Cl. ........................................ 524/120; 524/127
(58) Field of Search .................................. 524/120, 127

(56) References Cited

U.S. PATENT DOCUMENTS 5,240,978 A    8/1993  Fuhr et al.

FOREIGN PATENT DOCUMENTS

| DE | 4133259 A1 | 4/1993 |
| EP | 0947547 A1 | 10/1996 |

OTHER PUBLICATIONS

International Search Report, Jan. 17, 2002.

*Primary Examiner*—Kriellion A. Sanders
(74) *Attorney, Agent, or Firm*—Alston & Bird LLP

(57) ABSTRACT

The present invention relates to a halogen free flame retardant thermoplastic styrene resin composition. More particularly, the present invention relates to a flame retardant resin composition, comprising (A) a graft copolymer consisting of rubber modified styrenic resin, (B) a polycarbonate resin, (C) a phenol novolak resin, (D) a copolymer consisting of styrene, and (E) an aromatic phosphate. The resin composition of the present invention has a superior flame retardancy using a halogen free flame retardant and a little amount of polycarbonate resin.

12 Claims, No Drawings

HALOGEN FREE FLAME RETARDANT THERMOPLASTIC STYRENE RESIN COMPOSITION

CROSS REFERENCE TO RELATED APPLICATION

This application is based on application No. 2000-52392 filed in the Korean Industrial Property Office on Sep. 5, 2000, the content of which is incorporated hereinto by reference.

BACKGROUND OF THE INVENTION (a) Field of the Invention

The present invention relates to halogen free flame retardant thermoplastic styrenic resin composition. More particularly, to a thermoplastic styrenic resin composition, blending a little amount of polycarbonate and phenol novolak resin to rubber modified styrenic resin using an aromatic phosphate as a flame retardant.

(b) Description of the Related Art

Rubber modified styrenic resin has been used in electric and electronic goods and office machines because it has superior processing and physical properties. However, rubber modified styrenic resin has a matter of stabilization because it burns well in flames than other thermoplastic resins. Accordingly, studies of creating a flame retardant for rubber modified styrenic resin have progressed.

Halogen compounds are used as flame retardant for rubber modified styrenic resin. In addition, it is known that tetrabromobisphenol A and epoxy bromide are generally used halogen flame retardant and that antimony compound is a flame retardant synergistic material.

Physical properties and flame retardant effect of rubber modified styrenic resin are decreased by using halogen free flame retardant. So, the method of blending polycarbonate or polyphenylene-oxide with styrene resin is proposed for preparing halogen free flame retardant styrenic resin compound with superior physical properties and flame retardancy. But, polycarbonate and polyphenylene-oxide resin give flame retardant effect to resin when they are used as much as 70 percent by weight and 40 percent by weight, respectively. In addition, wherein the method has a matter of processing and economic respect. In particular, styrenic resin is generally added to improve the processing of the blends of polycarbonate and rubber modified styrenic resin, and since the content of polycarbonate is greater than 70 parts by weight based on the total resin, so the blend has a more similar characteristics to polycarbonate resin than styrene.

U.S. Pat. Nos. 5,204,394 and 5,061,745 are patents about the blends of polycarbonate and styrene, wherein the patents disclose obtaining flame retardant at polycarbonate in an amount of more than 70 percent by weight.

In addition, styrenic resin compound with superior flame retardancy using halogen free flame retardant and a little amount of polycarbonate resin is demanded.

SUMMARY OF THE INVENTION

As a result of repeating studies and experiments to resolve the problematic matters, the present inventors found that it was possible to prepare a flame retardant thermoplastic styrene resin composition, by blending a little amount of polycarbonate and phenol novolak resin to rubber modified styrenic resin, using an aromatic phosphate as a flame retardant and completed the present invention.

It is an object of the present invention to provide a styrenic resin with superior flame retardancy using halogen free flame retardant and a little amount of polycarbonate resin.

In order to achieve these objects and others, the present invention provides a flame retardant thermoplastic styrene resin composition, comprising
(A) a graft copolymer consisting of rubber modified styrenic resin, (B) a polycarbonate resin, (C) a phenol novolak resin, (D) a copolymer consisting of styrene, and (E) an aromatic phosphate selected from the group consisting of an aromatic monophosphate, an aromatic diphosphate, and a mixture thereof.

Preferably, flame retardant resin compound of the present invention comprises (A) a graft copolymer consisting of rubber modified styrenic resin in an amount of 10 to 59 parts by weight, (B) a polycarbonate resin in an amount of 10 to 40 parts by weight, (C) a phenol novolak resin in an amount of 5 to 20 parts by weight, and (D) a copolymer consisting of styrene in an amount of 20 to 70 parts by weight, and an aromatic monophosphate in an amount of 2 to 20 parts by weight or an aromatic diphosphate in an amount of 2 to 20 parts by weight, or a mixture of an aromatic monophosphate and an aromatic diphosphate in an amount of 2 to 20 parts by weight based on wherein (A)+(B)+(C)+(D) 100 parts by weight.

DETAILED DESCRIPTION OF THE PREFERRED EMBODIMENTS

The present invention will be described in detail below.

(A) A Graft Copolymer Consisting of Rubber Modified Styrenic Resin

A graft copolymer consisting of rubber modified styrenic resin composes base resin with polycarbonate resin, copolymer consisting of styrene, and phenol novolak resin, prefers using 10 to 50 parts by weight based on the total amount of based resin.

A graft copolymer consisting of rubber modified styrenic resin of the present invention is preferably resin which is at least one compound selected from the group consisting of styrene, α-methyl styrene, and styrene of substituting nucleus in an amount of 30 to 65 parts by weight, and at least one compound selected from the group consisting of acrylonitrile, methylmethacrylate, and butylacrylate in an amount of 10 to 30 parts by weight graft on rubber in an amount of 10 to 60 parts by weight.

In particular, acrylonitrile/butadiene/styrene(ABS) resin which is grafted acrylonitrile and styrene to butadiene rubber are generally used. Wherein graft copolymer resin can be prepared by general polymerization method, but preferably synthesized by bulk polymerization or emulsion polymerization method.

(B) A Polycarbonate Resin

A polycarbonate resin consists based resin with a graft copolymer consisting of rubber modified styrenic resin, copolymer consisting of styrene, and phenol novolak resin, prefers using 10 to 40 parts by weight on the total amount of based resin. A polycarbonate resin of the present invention doesn't contain halogen, also preferably prepared by reacting bivalent phenol compound with phosgene or diester carbonate. Bivalent phenol compound is preferably bisphenol-series, more preferably 2,2'-bis(4-hydroxylphenyl) propane that is bisphenol A.

(C) A Phenol Novolak Resin

A phenol novolak resin consists based resin with a graft copolymer consisting of rubber modified styrenic resin, polycarbonate resin, and copolymer consisting of styrene, prefers using 5 to 20 parts by weight on the total amount of based resin. A phenol novolak resin of the present invention is preferably represented by the following Formula 1:

[Formula 1]

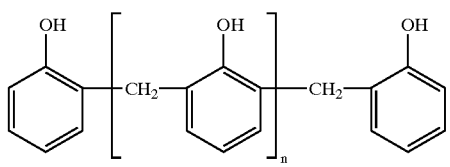

where, n is a degree of polymerization.

(D) A Copolymer Consisting of Styrene.

A copolymer consisting of styrene consists based resin with a graft copolymer consisting of rubber modified styrenic resin, copolymer consisting of styrene, and phenol novolak resin, prefers using 20 to 70 parts by weight on the total amount of based resin. A copolymer consisting of styrene of the present invention preferably consists of at least one compound selected from the group consisting of styrene, α-methyl styrene, and styrene of substituting nucleus in an amount of 50 to 90 parts by weight, and at least one compound selected from the group consisting of acrylonitrile, methylmethacrylate, and butylacrylate in an amount of 10 to 50 parts by weight. Wherein graft copolymer resin can be prepared by general polymerization method, but preferably synthesized by bulk polymerization or emulsion polymerization method.

(E) An Aromatic Phosphate

An aromatic phosphate of the present invention is selected from the group consisting of an aromatic monophosphate, an aromatic diphosphate, and a mixture thereof. Wherein an aromatic monophosphate or an aromatic diphosphate prefers using 2 to 20 parts by weight based on the total based resin (that is, wherein (A) a graft copolymer consisting of rubber modified styrenic resin+(B) a polycarbonate resin+(C) a phenol novolak resin+(D) a copolymer consisting of styrene) in an amount of 100 parts by weight, more preferably 5 to 15 parts by weight, respectively.

Wherein an aromatic monophosphate is selected preferably from the group which doesn't substitute halogen consisting of triakyl phosphate of like trimethyl phosphate, triethyl phosphate, tributyl phosphate, etc., triaryl phosphate of like triphenyl phosphate, tricresyl phosphate, trixylyly phosphate, cresyldiphenyl phosphate, etc., and triakyl-aryl phosphate of like otyldiphenyl phosphate, etc. Preferably, it uses triaryl phosphate, more preferably triphenyl phosphate, tri(4-methylphenyl)phosphate, tri(2,6-dimethylphenyl) phosphate.

Wherein an aromatic diphosphate is able to use a compound represented by the following Formula 2:

[Formula 2]

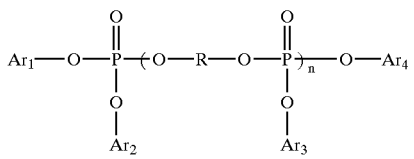

where,

Ar$_1$–Ar$_4$ are are same or independently a phenyl group, or a aryl group substituted alkyl group (component C$_1$–C$_4$) in a number of 1 to 3, R is phenyl or bisphenol A, and n is a degree of polymerizaton.

Also, wherein an aromatic diphosphate is able to use phentaerythityl diphosphate (PPP) represented by the following Formula 3:

[Formula 3]

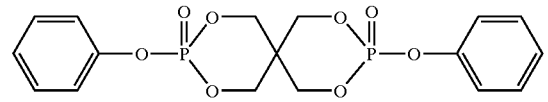

A composition of the present invention is able to include lubricants, heat stabilizer, antioxidant, light stabilizer, antidropping agent, pigment, and inorganic filler by a use thereof.

The following examples further illustrate the present invention.

EXAMPLE

A thermoplastic styrenic resin prepared by the following examples and comparative examples consist of (A) a graft copolymer consisting of rubber modified styrenic resin, (B) a polycarbonate resin, (C) a phenol novolak resin, (D) a copolymer consisting of styrene, and (E) an aromatic monophosphate or aromatic diphosphate, wherein the method for preparing and using thereof is as follows.

(A) A graft Copolymer Consisting of Rubber Modified Styrenic Resin

The present example was used DP215(LG Chem. Ltd.) as a graft copolymer consisting of rubber modified styrenic resin, wherein the resin is acrylonitrile/butadiene/styrene (ABS) resin which was grafted acrylonitrile in an amount of 30 parts by weight and styrene in an amount of 15 parts by weight to butadiene rubber in an amount of 50 parts by weight, was synthesized by emulsion polymerization.

(B) A Polycarbonate Resin

It used PC201 (DOW. Co. Ltd.) as a polycarbonate resin.

(C) A Phenol Novolak Resin

It used a phenol novolak resin represented by Formula 1 in the above statement, and it's degree of polymerization is 4.

(D) A Copolymer Consisting of Styrene

It used styrene in an amount of 70 to 80 parts by weight and acrylonitrile in an amount of 20 to 30 parts by weight, was synthesized by emulsion polymerization as a copolymer consisting of styrene.

(E) An Aromatic Phosphate

It used triphenylphosphate(TPP, Daihachi Co. Ltd, Japan) as an aromatic monophosphate.

It used diphenylphosphate(RDP, Dihachi Co. Ltd. Japan) or phenylpentaerythitylphosphate(PPP) represented by Formula 3 in the above statement as an aromatic diphosphate.

EXAMPLE 1

A resin composition was prepared by blending polycarbonate resin in an amount of 20 parts by weight and novolak resin in an amount of 10 parts by weight with graft copolymer consisting of rubber modified styrenic resin in an amount of 20 parts by weight and copolymer consisting of styrene in an amount of 50 parts by weight. For a flame retardant, monophosphate(TPP) in an amount of 15 parts by weight based on the total amount of based resin 100 parts by weight was used.

EXAMPLE 2

A resin composition was prepared by the same procedure as in Example 1, except that for a flame retardant, diphenylphosphate(RDP) in an amount of 15 parts by weight based on the total amount of based resin 100 parts by weight was used.

EXAMPLE 3

A resin composition was prepared by the same procedure as in Example 1, except that for a flame retardant, pentaerythithyldiphosphate(PPP) in an amount of 15 parts by weight based on the total amount of based resin 100 parts by weight was used,

EXAMPLE 4

A resin composition was prepared by the same procedure as in Example 1, except that for a flame retardant, monophosphate(TPP) in an amount of 5 parts by weight and diphenylphosphate(RDP) in an amount of 10 parts by weight based on the total amount of based resin 100 parts by weight was used.

EXAMPLE 5

A resin composition was prepared with polycarbonate resin in an amount of 40 parts by weight based on the total amount of based resin.

Comparative Example 1

A resin composition was prepared by not using a novolak resin.

Comparative Example 2

A resin composition was prepared with polycarbonate in an amount of 10 parts by weight based on the total amount of based resin.

Comparative Example 3

A resin composition was prepared with novolak resin in an amount of 20 parts by weight based on the total amount by based resin.

The melt flow rate(MFR) and flame retardancy of samples according to Example 1 to 5, and Comparative example 1 to 3 was measured. The MFR was measured in 220° C., 10 kg by ASTM D-1238, and the flame retardancy was measured by UL-94VB test method. The results are shown in Table 1.

TABLE 1

|  | Example | | | | | Comparative example | | |
| --- | --- | --- | --- | --- | --- | --- | --- | --- |
|  | 1 | 2 | 3 | 4 | 5 | 1 | 2 | 3 |
| DP215 | 20 | 20 | 20 | 20 | 20 | 20 | 20 | 20 |
| PC | 20 | 20 | 20 | 20 | 40 | 50 | 10 | 20 |
| Phenol novolak | 10 | 10 | 10 | 10 | 10 | — | 10 | 20 |
| SAN | 50 | 50 | 50 | 50 | 30 | 30 | 60 | 40 |
| TPP | 15 | — | — | 5 | — | — | — | — |
| RDP | — | 15 | — | 10 | 15 | 15 | 15 | 15 |
| PPP | — | — | 15 | — | — | — | — | — |
| MFR | 146.0 | 83.6 | 78.6 | 98.4 | 104.8 | 34.7 | 76.2 | 112.5 |
| Flame retardant | V-1 | V-1 | V-1 | V-1 | V-0 | X | X | V-1 |

As shown in Table 1, a resin composition according to Comparative example 1, blending of polycarbonate in an amount of 50 parts by weight did not exhibit a flame retardancy. However, in case of adding a novolak resin in an amount of 10 parts by weight to styrene copolymer as in Example 1 to 4, blending of polycarbonate resin in an amount of 20 parts by weight exhibited a flame retardancy of UL-94 V-1, and blending of polycarbonate resin in an amount of 40 parts by weight exhibited a flame retardancy of UL-94 V-0. In addition, when a novolak resin was used, fluidity was high. While, an addition of novolak resin more than 20 parts by weight according to Comparative example 3 did not increase flame retardancy. Polycarbonate in an amount of more than 20 parts by weight was preferable considering Comparative example 2.

As described above, judging from the present invention, blending a little amount of polycarbonate and novolak resin will increase flame retardancy. And the amount of polycarbonate can be decreased from 60 to 70 parts by weight to 10 to 40 parts by weight by adding a little amount of novolak resin in the flame retardant polycarbonate/ABS blend. Accordingly, it was possible to provide a flame retardant resin composition that improves the processing and economical efficiency.

What is claimed is:

1. A flame retardant thermoplastic resin composition comprising:
   (A) a graft copolymer consisting of rubber modified styrenic resin in an amount of 10 to 50 parts by weight;
   (B) a polycarbonate resin in an amount of 10 to 40 parts by weight;
   (C) a phenol novolak resin in an amount of 5 to 20 parts by weight;
   (D) a copolymer consisting of styrene in an amount of 5 to 70 parts by weight; and
   (E) an aromatic phosphate in an amount of 2 to 20 parts by weight, based on (A)+(B)+(C)+(D) in an amount of 100 parts by weight.

2. The flame retardant thermoplastic resin composition of claim 1, wherein (E) an aromatic phosphate is selected from the group consisting of an aromatic monophosphate, an aromatic diphosphate, and a mixture thereof.

3. The flame retardant thermoplastic resin composition of claim 2, wherein the resin composition is comprising an aromatic monophosphate in an amount of 2 to 20 parts by weight or an aromatic diphosphate in an amount of 2 to 20 parts by weight, or a mixture of an aromatic monophosphate and an aromatic diphosphate in an amount of 2 to 20 parts by weight based on (A)+(B)+(C)+(D) in an amount of 100 parts by weight (Wherein, in this statement, (A)+(B)+(C)+

(D) is represented (A) a graft copolymer consisting of rubber modified styrenic resin, (B) a polycarbonate resin, (C) a phenol novolak resin, and (D) a copolymer consisting of styrene).

4. The flame retardant thermoplastic resin composition of claim 1, wherein the graft copolymer consisting of rubber modified styrenic resin (A) includes at least one compound selected from the group consisting of styrene, α-methyl styrene, and styrene of substituting and at least one compound selected from the group consisting of acrylonitrile, methylmethacrylate, and butylacrylate graft on rubber.

5. The flame retardant thermoplastic resin composition of claim 1, wherein phenol novolak resin (C) is represented by the following Formula 1:

[Formula 1]

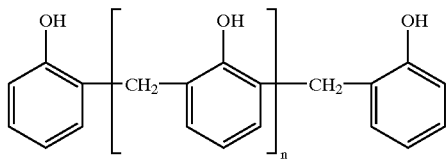

where, n is a degree of polymerization.

6. The flame retardant thermoplastic resin composition of claim 1, wherein the polycarbonate resin (B) is prepared by reacting bivalent phenol compound with phosgene or diester carbonate, not using halogen.

7. The flame retardant thermoplastic resin composition of claim 1, wherein the copolymer consisting of styrene(D) consists of at least one compound selected from the group consisting of styrene, α-methyl styrene, and styrene of substituting nucleus in an amount of 50 to 90 parts by weight, and at least one compound selected from the group consisting of acrylonitrile, methylmethacrylate, and butylacrylate in an amount of 10 to 50 parts by weight.

8. The flame retardant thermoplastic resin composition of claim 2, where the aromatic monophosphate comprises a non-halogenated compound selected from the group consisting of trialkylphosphate, triarylphosphate, and trialkylarylphosphate.

9. The flame retardant thermoplastic resin composition of claim 8, wherein triakylphosphate is selected from the group consisting of trimethylphosphate, triethylphosphate, tributylphosphate, and trioctylphosphate, wherein triarylphosphate is selected from the group consisting of triphenylphosphate, tricresylphosphate, trixylylyphosphate, and cresyldiphenylphosphate, wherein triakylarylphosphate is octyldiphenylphosphate.

10. The flame retardant thermoplastic resin composition of claim 2, wherein an aromatic diphosphate is represented by the following Formula 2: [Formula 2]

[Formula 2]

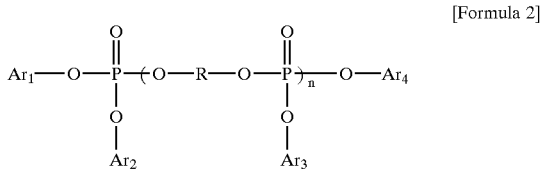

where, $Ar_1$–$Ar_4$ are the same or independently a phenyl group or an aryl group substituted alkyl group (component $C_1$–$C_4$) in a number of 1 to 3, R is phenyl or bisphenol A, and n is a degree of polymerization.

11. The flame retardant thermoplastic resin composition of claim 2, wherein an aromatic diphosphate is represented by the following Formula 3.

[Formula 3]

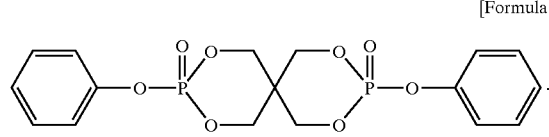

12. The flame retardant thermoplastic resin compound of claim 1, wherein a flame retardant resin compound further containing lubricants, heat stabilizer, antioxidant, light stabilizer, antidropping agent, pigment, and inorganic filler.

* * * * *